(12) United States Patent
Greenaae et al.

(10) Patent No.: US 7,564,959 B2
(45) Date of Patent: Jul. 21, 2009

(54) BILLABLE ACTIVITY PROCESSING

(75) Inventors: Gregory Greenaae, Kirkland, WA (US); Nicholas Thomson, Redmond, WA (US); Samir Manjure, Redmond, WA (US); Lars Mikkelsen, Redmond, WA (US); Robert Blanch, Clyde Hill, WA (US)

(73) Assignee: Microsoft Corporation, Redmond, WA (US)

( * ) Notice: Subject to any disclaimer, the term of this patent is extended or adjusted under 35 U.S.C. 154(b) by 851 days.

(21) Appl. No.: 10/989,198

(22) Filed: Nov. 15, 2004

(65) Prior Publication Data

US 2006/0104427 A1 May 18, 2006

(51) Int. Cl.
*H04M 15/00* (2006.01)

(52) U.S. Cl. ............. 379/111; 379/114.01; 379/114.03; 379/121.05; 379/199

(58) Field of Classification Search .............. 379/111, 379/112.01, 112.07, 112.08, 114.01, 114.03, 379/118, 120, 121.03, 121.05, 122, 126, 379/127.01, 129–130, 133, 135–136, 114.05
See application file for complete search history.

(56) References Cited

U.S. PATENT DOCUMENTS

| 5,493,492 | A | * | 2/1996 | Cramer et al. ................. 705/32 |
| 5,841,847 | A | * | 11/1998 | Graham et al. ......... 379/114.03 |
| 5,966,649 | A | * | 10/1999 | Gulliford et al. ............ 455/408 |
| 5,991,742 | A | * | 11/1999 | Tran ............................ 705/32 |
| 6,240,167 | B1 | * | 5/2001 | Michaels ............... 379/106.03 |
| 2001/0024497 | A1 | * | 9/2001 | Campbell et al. ...... 379/265.09 |
| 2001/0026609 | A1 | * | 10/2001 | Weinstein et al. ........ 379/93.01 |
| 2002/0116185 | A1 | * | 8/2002 | Cooper et al. ............... 704/231 |
| 2006/0165066 | A1 | * | 7/2006 | Campbell et al. ........... 370/352 |

* cited by examiner

*Primary Examiner*—Binh K Tieu
(74) *Attorney, Agent, or Firm*—Westman, Champlin & Kelly, P.A.

(57) ABSTRACT

A system is disclosed for processing billable activities. The system includes a scheduling component configured to support creation of a plurality of activity records. A sub-set of the activity records are designated as being associated with billable activity. The system also includes an accounting component for receiving information based on the sub-set of the activity records. The information is transmitted from the scheduling component to the accounting component.

30 Claims, 9 Drawing Sheets

BILLABLE ACTIVITY PROCESSING

BACKGROUND OF THE INVENTION

The present invention generally pertains to methods for processing billable activities. More specifically, the present invention pertains to methods for leveraging a personal time and/or contact management application to enable simplified billing to a proper account for time an individual dedicates to billable activities.

Various professions require individuals to track the quantity of time they spend working for different accounts or clients. It is common for such individuals to keep a daily billing sheet, which specifically lists daily billable activity on and account-by-account or client-by-client basis. Typically, the information from billing sheets is eventually transferred, sometimes manually, to an application designed to process the time entries for invoicing, bookkeeping or other purposes.

There are currently software applications available that have been designed to support scheduling, task-tracking, contact management and other personal and business organization functionality. There are also software applications specifically designed to support customer relationship management. To the extent that these applications include time management functionality, they are generally not configured to distinguish between billable and non-billable time. It would be desirable to extend the functionality of such programs to support management and processing of timed activities designated as billable.

SUMMARY OF THE INVENTION

Embodiments of the present invention pertain to a system for processing billable activities. The system includes a scheduling component configured to support a creation of a plurality of activity records. A sub-set of the activity records are designated as being associated with billable activity. The system also includes an accounting component for receiving information based on the sub-set of the activity records. The information is transmitted from the scheduling component to the accounting component.

BRIEF DESCRIPTION OF THE DRAWINGS

FIG. 5 is an example screen shot demonstrating an appointment display.

FIG. 8 is an example screen shot demonstrating the billable time submission component.

DETAILED DESCRIPTION OF ILLUSTRATIVE EMBODIMENTS

Prior to discussing illustratively embodiments of the present invention in detail, one illustrative environment in which the present invention can be used will be discussed.

Figure 1:
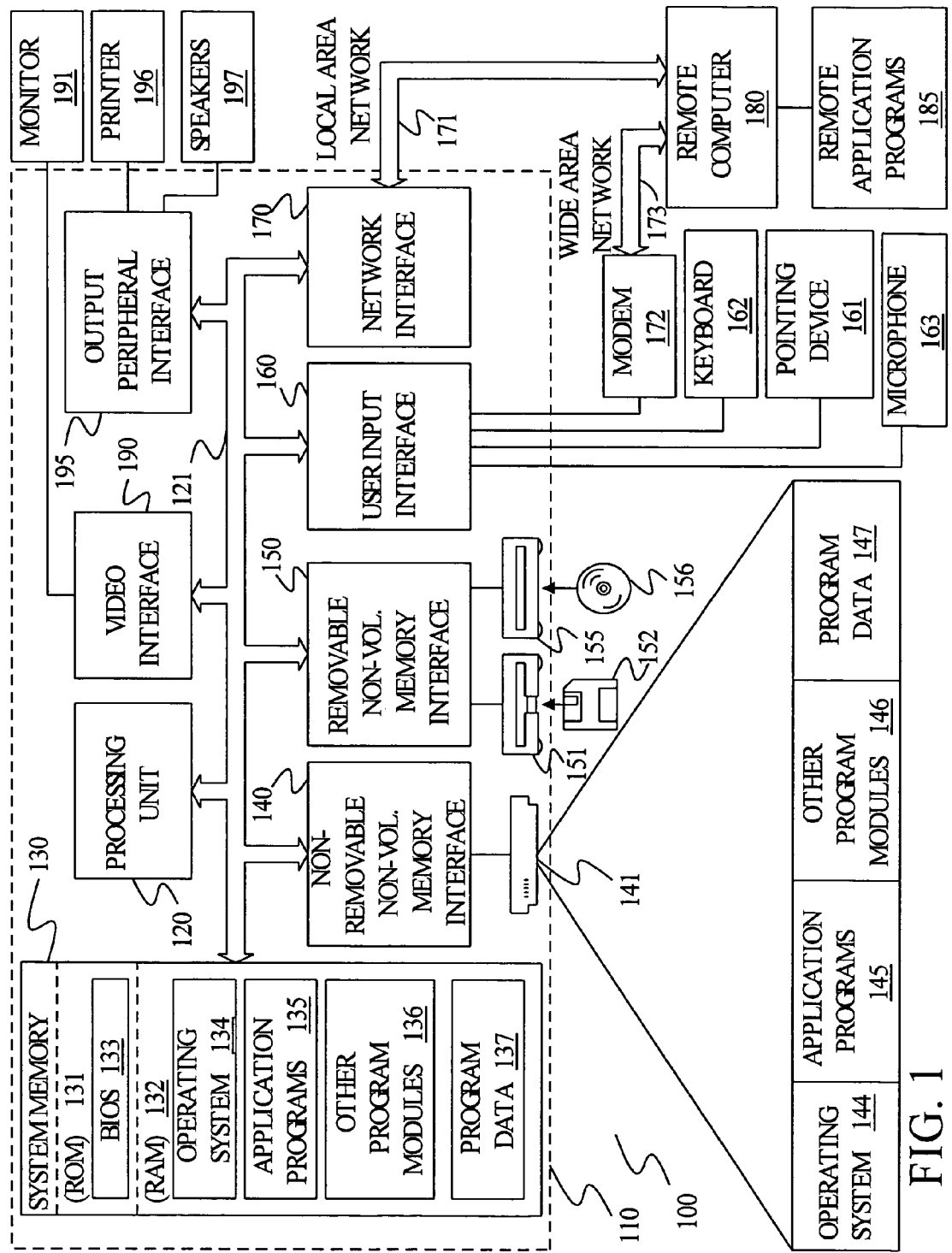
FIG. 1 is a block diagram of one embodiment of an environment in which the present invention can be used.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both locale and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a locale bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100. Communication media typically embodies computer readable instructions, data structures, program modules or other data in a modulated data signal such as a carrier WAV or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way o example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a locale area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that the present invention can be carried out on a computer system such as that described with respect to FIG. 1. However, the present invention can be carried out on a server, a computer devoted to message handling, or on a distributed system in which different portions of the present invention are carried out on different parts of the distributed computing system.

Figure 2:
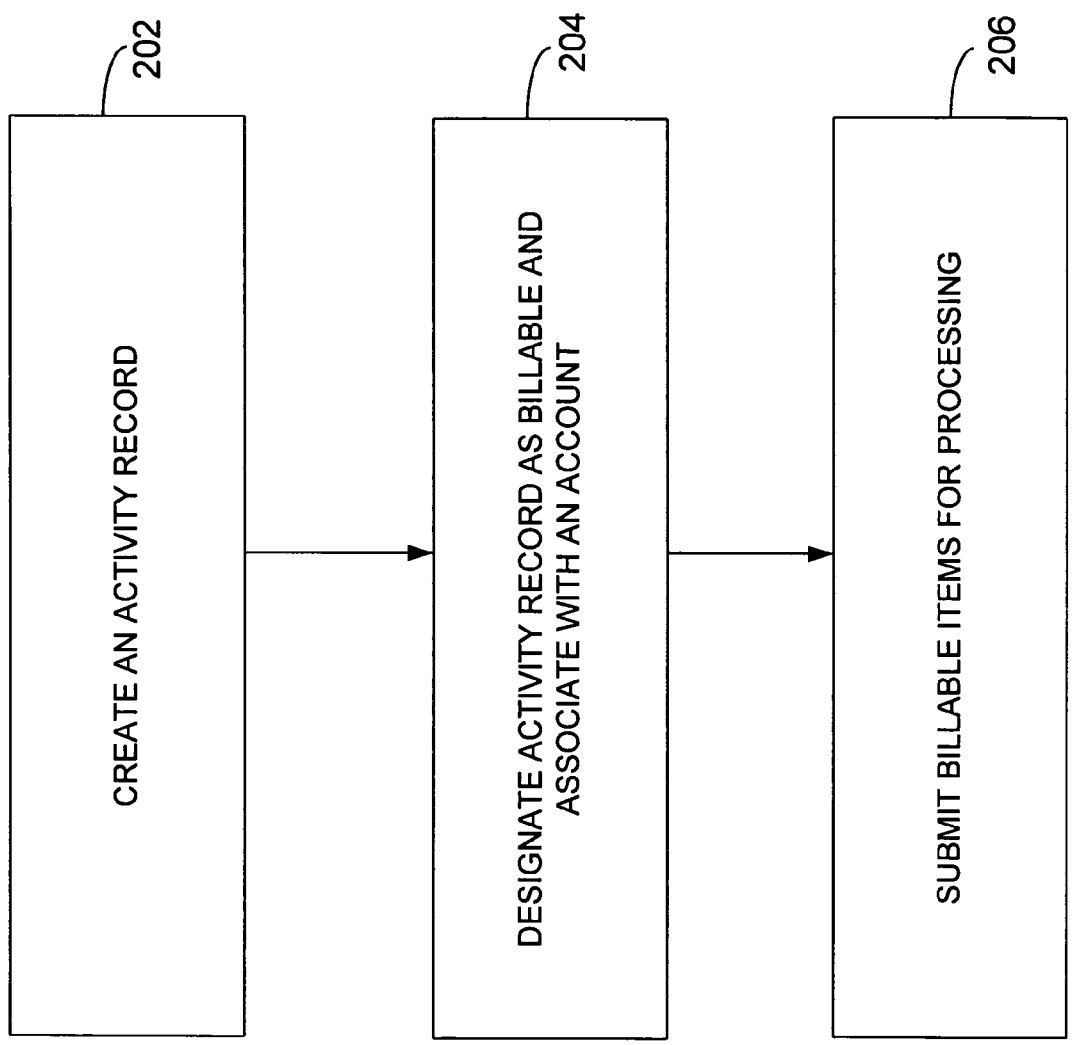
FIG. 2 is a flow chart diagram illustrating steps associated with a billable time management process.

FIG. 2 is a flow chart diagram illustrating steps associated with a billable time management process to be implemented in the context of a time management, business contact or other similar application. As is indicated by block 202, a first step is to create an activity record. An activity record is illustratively a record created within the application as a reflection of how an individual spends or will spend a particular period of time. In accordance with one embodiment, the record is a log of a telephone conversation. In accordance with another embodiment, the record is a calendar appointment. In accordance with another embodiment, the record is task-oriented. These are just a few of many applicable examples. Specific illustrations of activity records will be described below in relation to other Figures. It should be noted, however, that the precise nature of an activity record is not critical to the present invention.

As is indicated by block 204, a next step is for the activity record to be designated as billable and associated with an account. In accordance with one embodiment, the system is configured for at least a portion of this step to occur automatically. For example, some activities (e.g., a phone record) can be set to billable by default. Or, an account might be automatically assumed based on a predefined set of circumstances (e.g., a predictable billing pattern). Of course, in one embodiment, any automatic assumption can be manually overridden.

In another embodiment, the system is configured for step 204 to be at least partially carried out by the system operator. For example, the individual for who time is being tracked enters the information directly. In other words, the operator marks an activity record as billable and enters appropriate account information.

Finally, as is indicated by block 206, the system is configured to enable records marked as billable to be submitted to an accounting entity or application for bookkeeping or other purposes.

FIGS. 3-9 are example screen shots demonstrating displays that can be provided to support execution of the described series of steps. The screen shots are illustratively provided as components of a time management, business contact or some other application. Examples of suitable applications include the various versions of Microsoft Outlook provided by Microsoft Corporation of Redmond, Wash., as well as specific modules designed therefor. For the purpose of illustration only, the screen shots of FIGS. 2-9 are customized for application within the legal industry. However, the scope of the present invention is not limited to applications within that industry.

In accordance with an example scenario, a lawyer employed by a law firm is taking a call from a client. The time on the phone is illustratively of a nature that it should be charged to a client account. Within his business contact application, the lawyer brings up the corresponding account or contact and adds a new phone activity.

Figure 3:
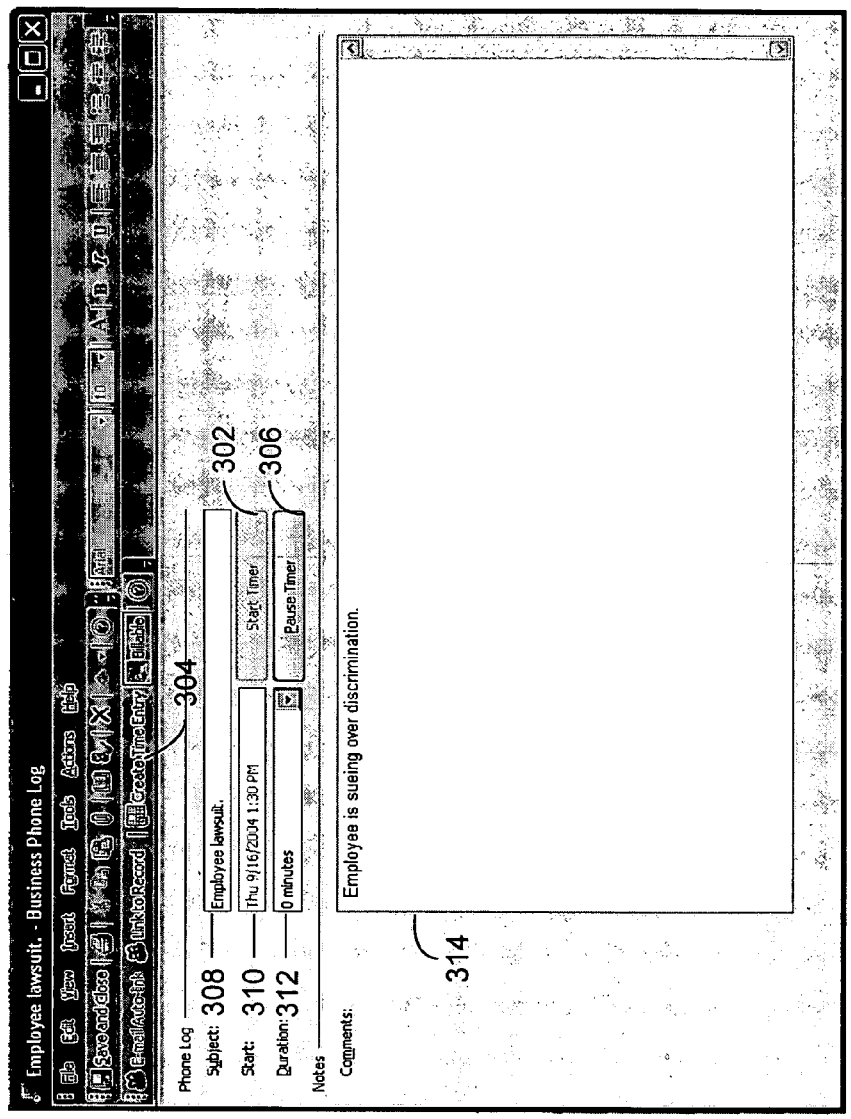
FIG. 3 is an example screen shot demonstrating a phone log display.

FIG. 3 is an example of a screen shot 300 with which the lawyer is presented upon initiation of the new phone activity. The lawyer selects a start timer button 302 in order to track the quantity of time spent on the phone. At the end of the call, a create time entry button 304 is selected from the toolbar to create a time entry for accounting purposes. Pressing button 304 illustratively provides a stopping point for the tracking of the phone call time. A pause timer button 306 can be selected and re-selected as desired to start and stop the tracking of time. A subject can be entered into text box 308. A duration can be set within selection box 312 (e.g., rather than tracking time for the duration). A start time is automatically or manually entered into text box 310. Comments can be entered into text box 314.

Figure 4:
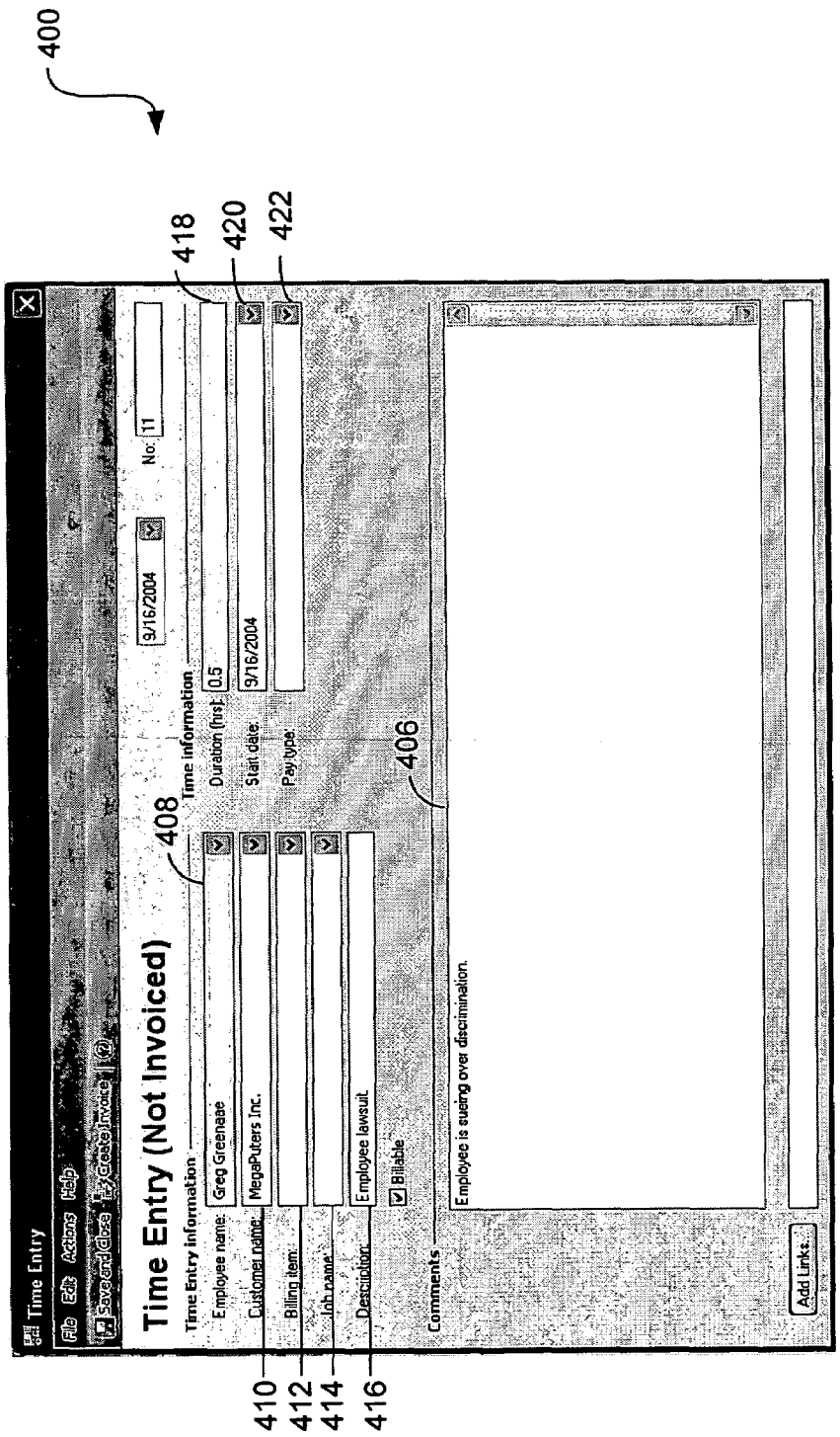
FIG. 4 is an example screen shot demonstrating a time entry display.

FIG. 4 is an example of a screen shot 400 with which the lawyer is presented upon selection of the create time entry button 304. The activity will be processed as a billing item if a check box 402 is marked to designate the activity as billable. Comments within a text box 406 are illustratively imported from box 314 but can be modified if necessary. In one embodiment, changes made in association with screen 400 will supercede notations made in association with screen 300. Information for other of the illustrated control items may be similarly imported and/or modified (this applies to all Figures referenced herein). The name of the lawyer is entered into text box 408. The name of the client is entered into box 410. A billing item is entered into box 412, a job name into box 414 and a description into box 416. Boxes 418, 420 and 422 are for duration, start date and pay types, respectively. It should be noted that it is true for all of the screen shots herein that the information and control items thereon are illustratively only. Other information and control schemes could be adopted without departing from the scope of the present invention.

Accordingly, calls can be recorded and made available for billing purposes in the described manner. In another aspect of the present invention, appointments to client sites that are billable can be similarly marked and made available for billing purposes.

Figure 5:
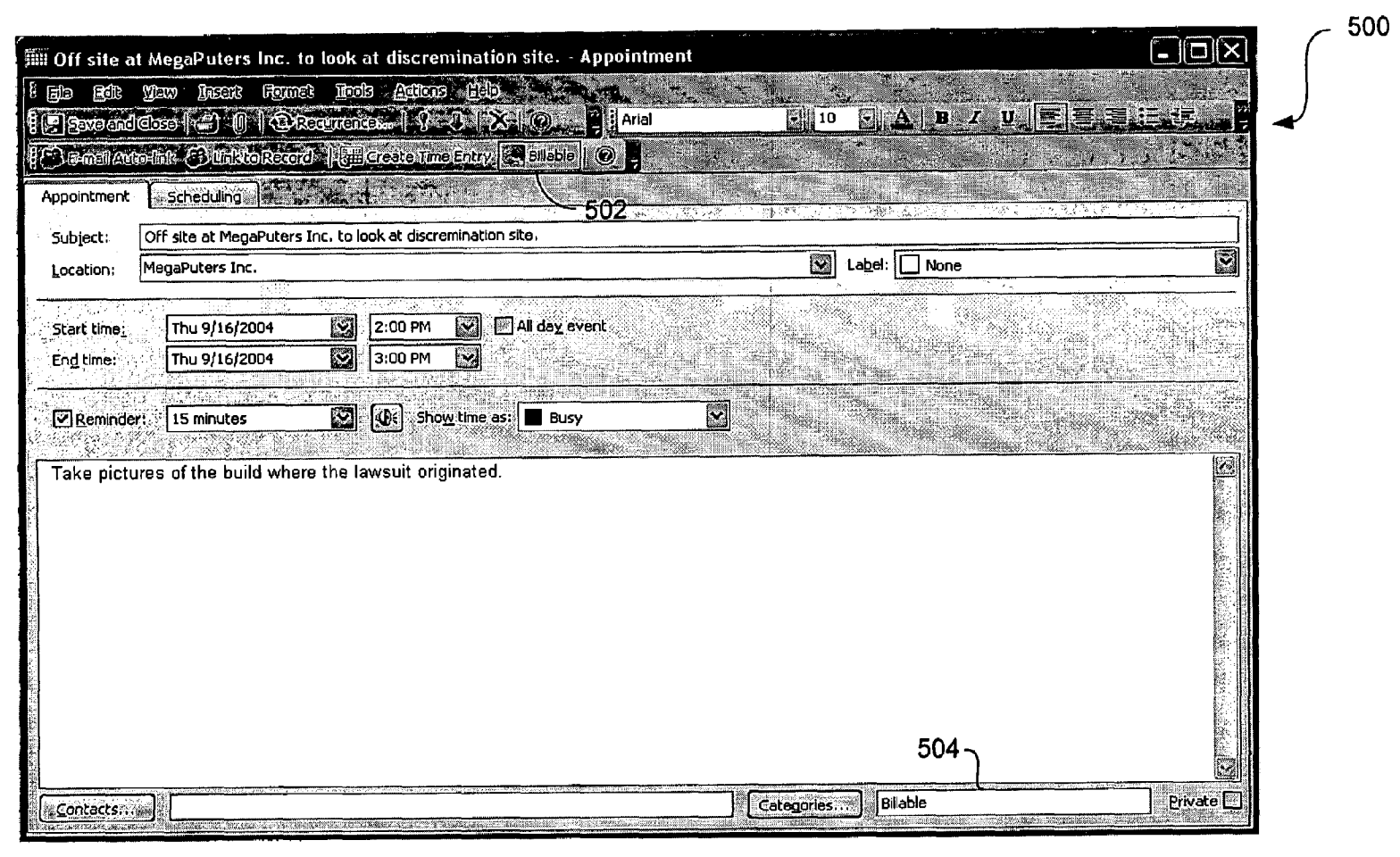

FIG. 5 is an example of a screen shot 500 with which the lawyer is presented when entering or editing an appointment. A billable button 502 can be selected in order to make the record available for billing purposes. A display box 504 indicates that the appointment has been designated as billable.

Figure 6:
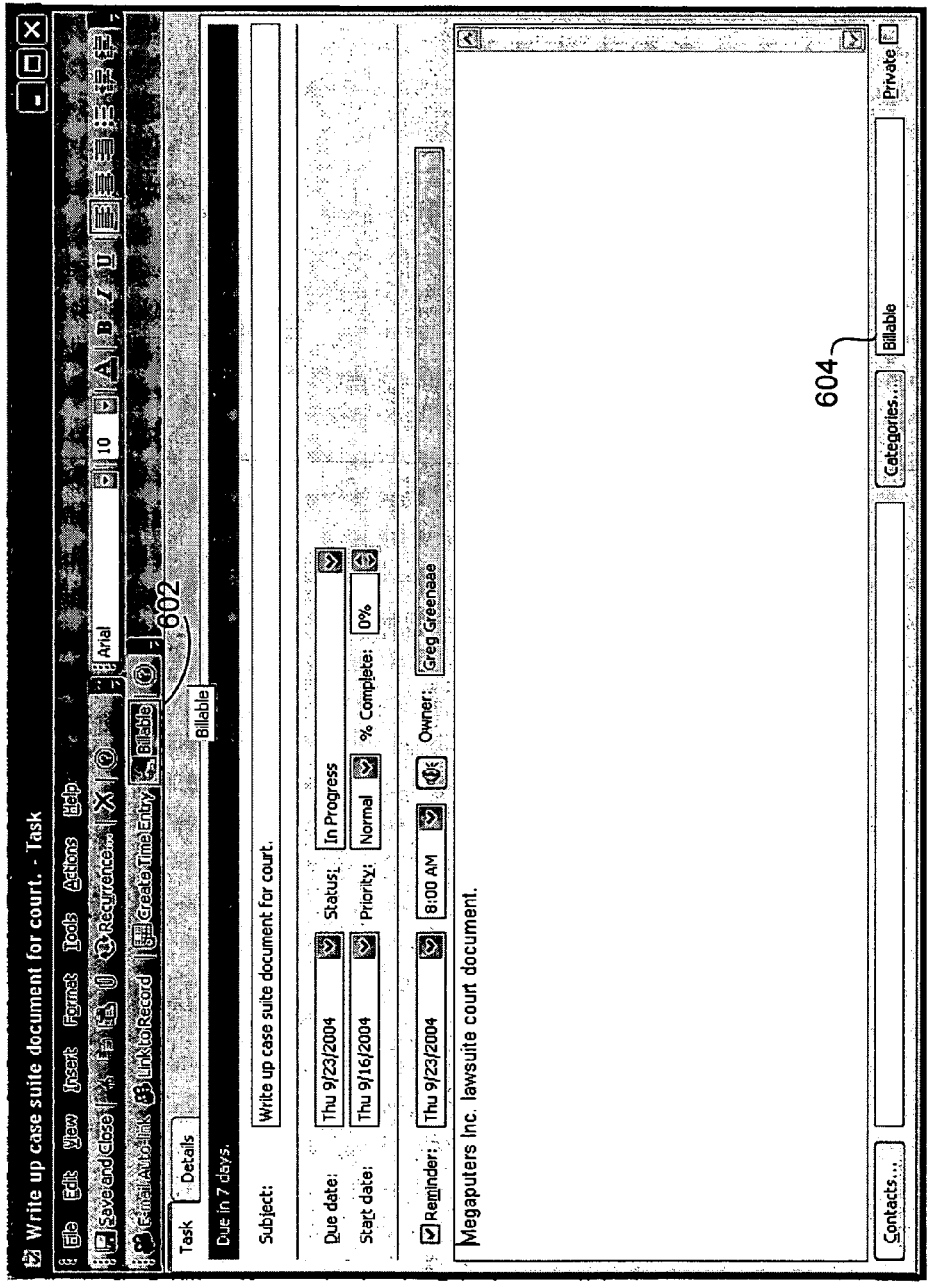
FIG. 6 is an example screen shot demonstrating a task display.

In another aspect of the present invention, tasks that are billable can be similarly marked and made available for billing purposes. FIG. 6 is an example of a screen shot 600 with which the lawyer is presented when entering or editing a task. A billable button 602 can be selected in order to make the record available for billing purposes. A display box 604 indicates that the appointment has been designated as billable. In one embodiment, a duration can be entered for billing purposes.

Figure 7:
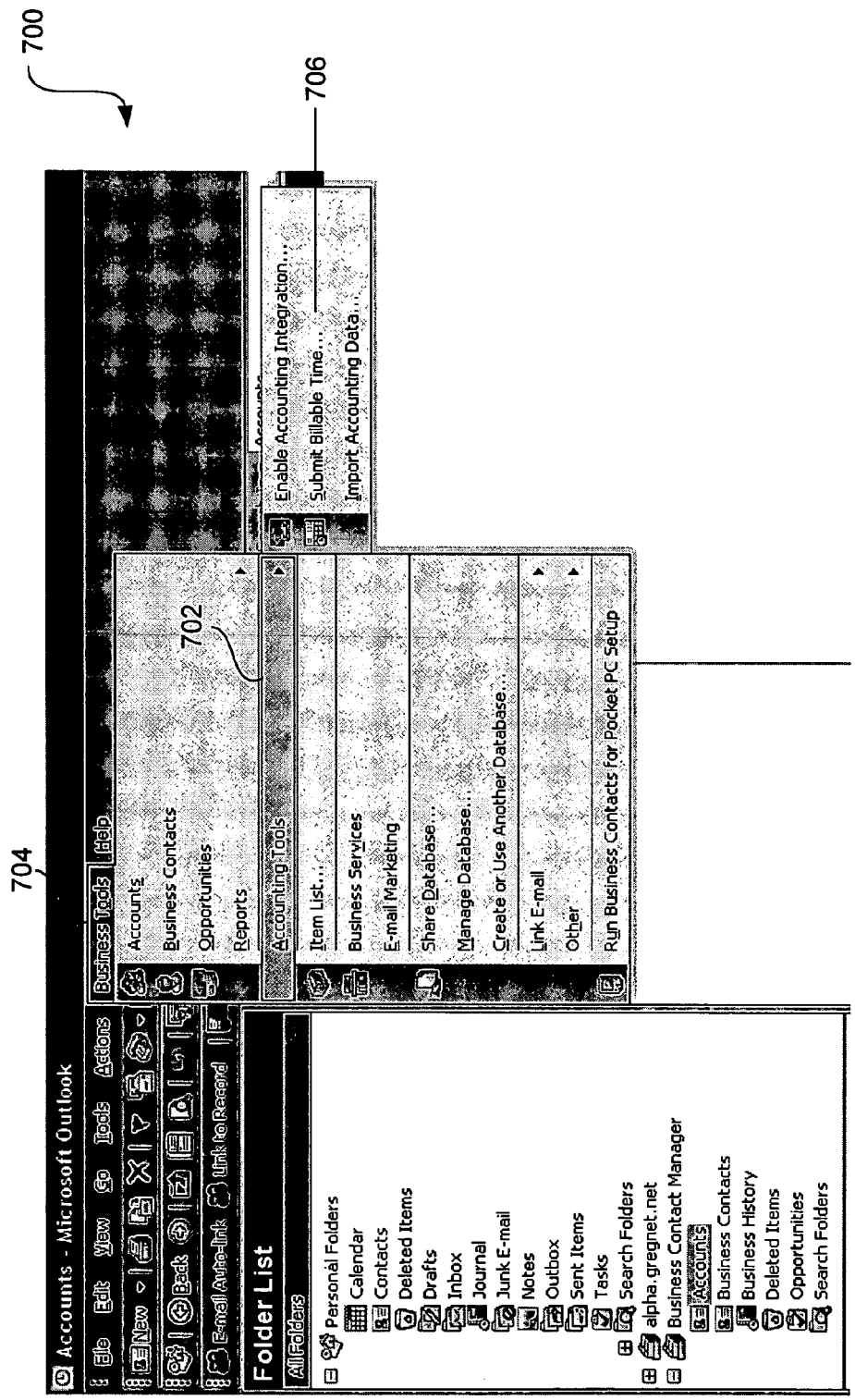
FIG. 7 is an example screen shot demonstrating means for accessing a billable time submission component.

In accordance with another aspect of the present invention, the lawyer can at any time (e.g., every time a billable entry is made, weekly, monthly, etc.) submit all tracked activities indicated as billable to an accounting system. FIG. 7 is an example screen shot 700 demonstrating how the attorney accesses an accounting tools menu 702 from a business tools button 704 on the main tool bar. A submit billable time item 706 is then selected to initiate transfer of activities indicated as billable to the accounting system or application. Of course, other means for initiating the submission of billable items are within the scope of the present invention.

Figure 8:
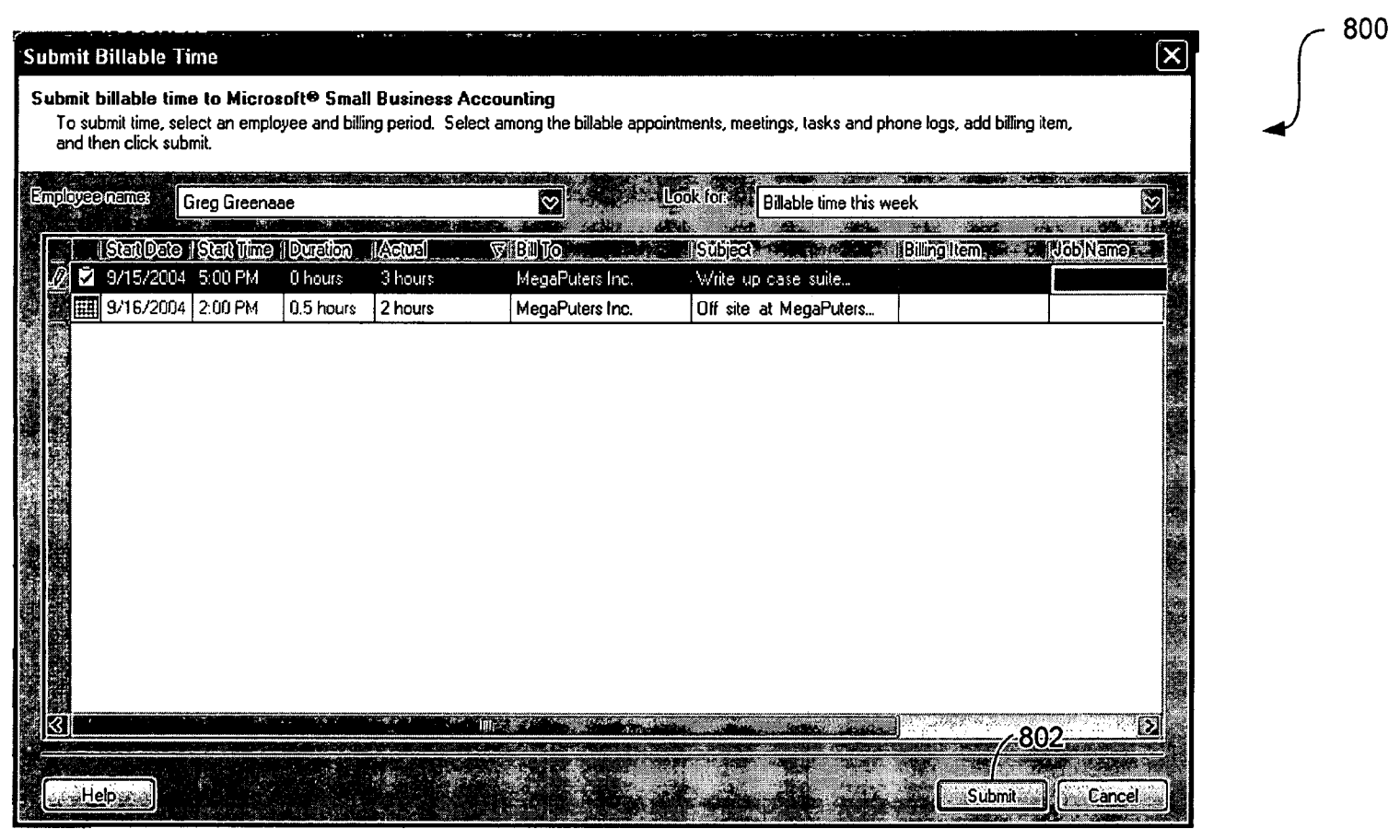

FIG. 8 is an example of a screen shot 800 with which the lawyer is presented upon initiation of the process of submitting billable time. As is illustrated, the attorney selects an employee and billing period for time submission. Then, billable appointments, meetings, tasks and phone logs are selected as desired. Finally, selected items are submitted to a billing (or any other) application upon selection of a submit button 802.

Figure 9:
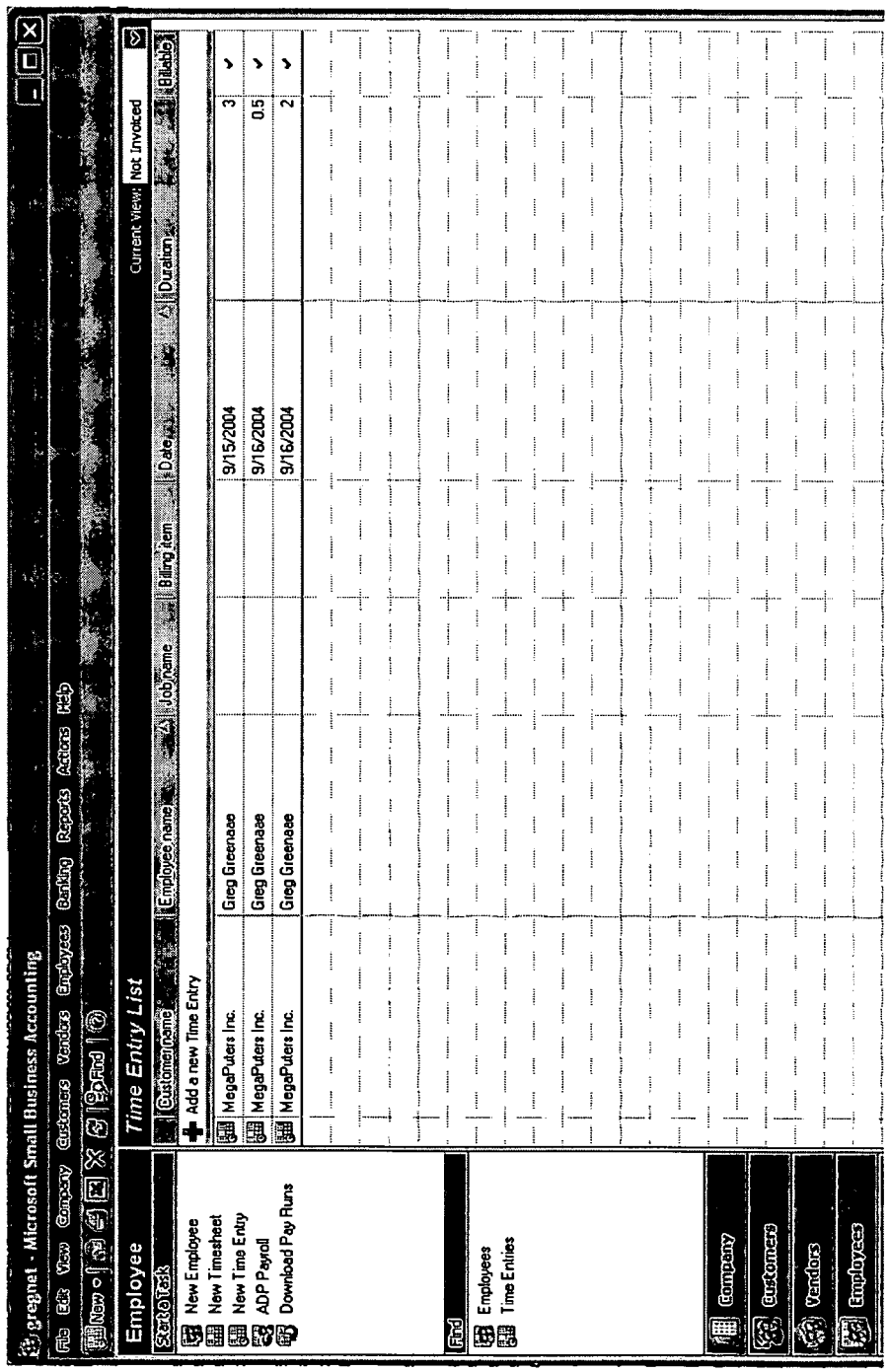
FIG. 9 is an example screen shot demonstrating an accounting application display after a plurality of time entries have been transferred thereto.

FIG. 9 is an example of a screen shot 900. Screen 900 is illustratively taken from an accounting application to which the billable time was submitted in the context of FIG. 8. Screen shot 900 shows activities broken down by time as is beneficial for billing, reporting and other purposes. In accordance with one embodiment, the attorney is able to access reports and other information as desired to track time, including billable and billed time. Such reports are illustratively retrievable from the local application and/or the accounting application.

It should be noted that the present application is not limited to the submission of time to an accounting application. Billable time entries could be exported to any application without departing from the scope of the present invention.

Although the present invention has been described with reference to particular embodiments, workers skilled in the art will recognize that changes may be made in form and detail without departing from the spirit and scope of the invention.

What is claimed is:

1. A system for processing billable activities, the system comprising:
   a scheduling component configured to support a creation of a plurality of activity records, wherein a sub-set of the activity records are designated as being associated with billable activity;
   an accounting component for receiving information based on the sub-set of the activity records, wherein said information is transmitted from the scheduling component to the accounting component;

wherein each of the plurality of activity records is a calendar appointment within a time management application, each of the calendar appointments including a start time and a stop time, the start time and the stop time on a different day in the future relative to the day upon which their corresponding calendar appointment was created; and wherein each of the calendar appointments includes a description to be tended to on the different day in the future.

2. The system of claim 1, wherein the information that is transmitted is transmitted in response to a user-initiated request for transmission, the user-initiated request including a selection of a billing period associated with the sub-set of the activity records.

3. The system of claim 1, wherein the information that is transmitted is transmitted as part of a scheduled periodic transmission.

4. The system of claim 2, wherein the information that is transmitted includes the description to be tended to on the different day in the future, a customer name, a time duration, and a date.

5. The system of claim 1, wherein the sub-set of the activity records that are designated as being associated with billable activity are activity records that have been manually marked as billable by a system operator and wherein the sub-set of the activity records includes account information entered by the system operator.

6. The system of claim 1, wherein the sub-set of the activity records that are designated as being associated with billable activity are activity records that have been automatically identified as billable based on a predefined set of circumstances.

7. The system of claim 6, wherein the predefined set of circumstances includes a predictable billing pattern.

8. The system of claim 6, wherein the predefined set of circumstances includes a default setting that is manually overridable.

9. A computer-implemented method for processing billable activities, the method comprising:

creating an activity record wherein creating an activity record comprises creating a task record that includes a due date designating when a task is to be completed and a reminder date upon which a reminder to complete the task should be sent, the due date and the reminder date being on a different day in the future relative to the day upon which the task record is created;

designating the activity record as billable;

associating the activity record with an account;

importing information from the task record to create a time entry record, wherein the imported information is modifiable by a system operator; and transferring the time entry record to a processing application.

10. The method of claim 9, wherein transferring comprises transferring in response to a user-initiated request.

11. The method of claim 9, wherein transferring comprises transferring as part of a schedule periodic transmission.

12. The method of claim 9, wherein transferring comprises transferring information pertinent to billing for services rendered and transferring every time a time entry record is created.

13. The method of claim 9, wherein designating the activity record as billable comprises the system operator manually marking a check box.

14. The method of claim 9, wherein designating the activity record as billable comprises automatically designating based on a predefined set of circumstances.

15. The method of claim 9, wherein associating the activity record with an account comprises receiving a user-initiated account entry.

16. The method of claim 9, wherein associating the activity record with an account comprises automatically associating.

17. The method of claim 9, wherein creating an activity record comprises creating a record for an event that has not yet occurred.

18. The method of claim 9, wherein transferring to a processing application comprises transferring to an accounting application.

19. The method of claim 18, wherein importing information from the task record comprises importing information from a subject field, a comments field, a date field, and an owner name field.

20. The method of claim 19, wherein creating an activity record further comprises creating an appointment record, and wherein importing information further comprises importing information from the appointment record to create a second time entry record, the information from the appointment record including a date, a time duration, a subject, and a description.

21. The method of claim 20, wherein creating an activity record further comprises creating a phone log record, and wherein importing information further comprises importing information from the phone log record to create a third time entry record, the information from the phone log record including a time duration, a subject, a date, and a description.

22. The method of claim 21, further comprising:

retrieving a report from the accounting application, the report listing the time entry record, the second time entry record, and the third time entry record.

23. The method of claim 22, wherein the report provides dates and time durations for the time entry record, the second time entry record, and the third time entry record.

24. A system for processing billable activities, the system comprising:

a scheduling component configured to support a creation of a plurality of activity records, wherein a sub-set of the activity records are designated as being associated with billable activity, wherein the sub-set of the activity records includes logs of telephone conversations created within a business contact application, each of the telephone conversation logs including a phone call time; and an accounting component for receiving information based on the sub-set of the activity records, wherein said information is transmitted from the scheduling component to the accounting component.

25. The system of claim 24, wherein the sub-set of activity records that are designated as being associated with billable activity further includes appointments and tasks that are each selected as billable by a system operator, and wherein the logs of telephone conversations, the appointments, and the tasks are for one billing period.

26. The system of claim 25, wherein one of the phone call times is based at least in part on a selection of a start timer button that begins the tracking of the phone call time, a selection of a create time entry button that ends the tracking of the phone call time, and a selection of a pause timer button that interrupts the tracking of the one of the phone call times.

27. The system of claim 26, wherein a second one of the phone call times is automatically tracked and wherein one of the telephone conversations is recorded and made available for billing purposes.

28. The system of claim 27, wherein reports are retrievable from the accounting component, the reports including a plurality of entries, wherein each entry has a customer name field, duration field, and an indication of whether or not the time is billable.

29. The system of claim 28, wherein one of the telephone conversation logs includes a subject field, a start date and time field, and a comments field.

30. The system of claim 29, wherein one of the appointments includes a subject field, a location field, a start time and date field, an end time and date field, a comments field, a reminder check box, and a "show time as" field, and wherein one of the tasks includes a subject field, a due date field, a start date field, a status field, a priority field, a percentage complete field, an owner field, and a comments field.

* * * * *